Aug. 27, 1963  G. CAROLI ETAL  3,101,825
HYDRAULIC CLUTCH
Filed Sept. 9, 1960
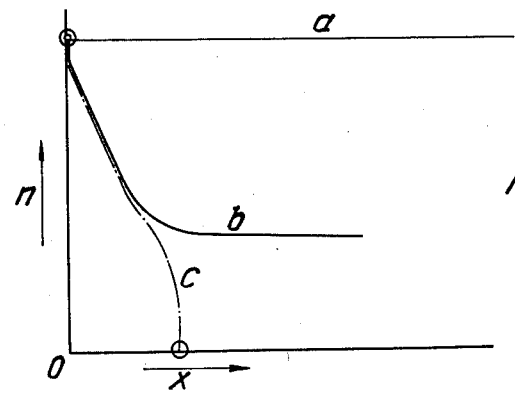
Fig. 2
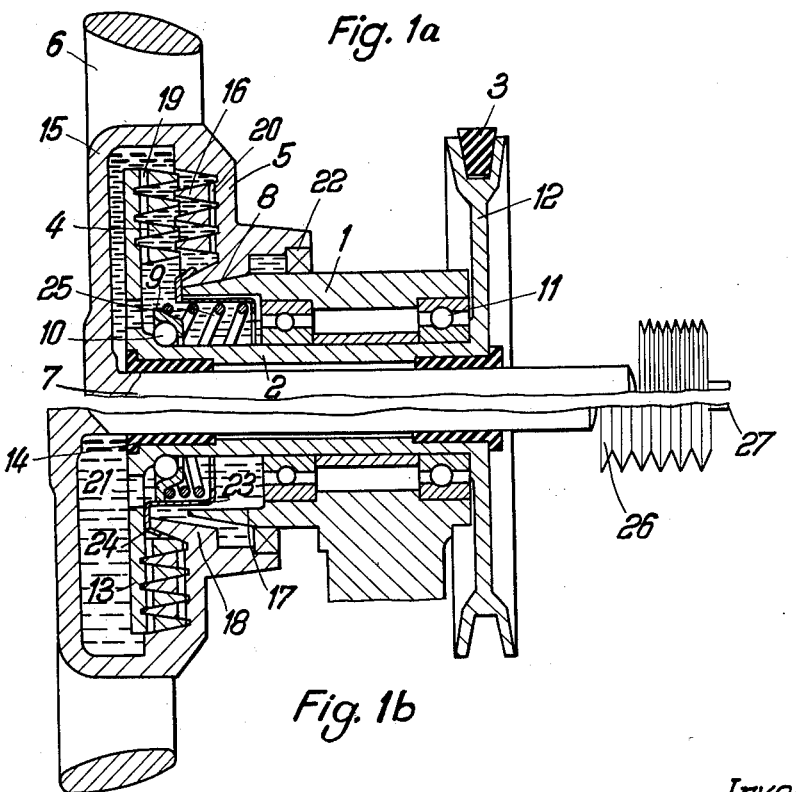
Fig. 1a
Fig. 1b
Inventors:
Gerhard Caroli
Otto Lutz
By Alvin Browdy
Attorney

United States Patent Office 3,101,825
Patented Aug. 27, 1963

3,101,825
HYDRAULIC CLUTCH
Gerhard Caroli, 8 Mauserstrasse, Stuttgart-Feuerbach, Germany, and Otto Lutz, 53 Bienroder Weg, Braunschweig, Germany
Filed Sept. 9, 1960, Ser. No. 55,006
Claims priority, application Germany Sept. 10, 1959
6 Claims. (Cl. 192—18)

This invention relates to a hydraulic clutch mechanism having a driving member and a driven member for the transmission of power and more specifically to a hydraulic clutch device having an internal clutch arrangement for halting the rotation of the driven member of the hydraulic clutch after the driving force for rotating the driving member has abated.

It is well known in the art to utilize hydraulic clutches having two opposing rotatable discs with circular interleaved protrusions of tapering cross section located thereon so as to enable the circular protrusions of one disc to enter the spaces between the circular protrusions of the other disc as the discs are moved axially towards or away from each other in a high viscosity oil medium. The adhesive or cohesive action of the liquid will cause the driven disc of the hydraulic clutch to rotate with the driving disc.

In addition, the hydraulic clutches of the prior art generally utilize an added conical friction clutch which is so arranged as to bring about a friction drive between the driving and the driven discs at the culmination of the hydraulic clutch engaging movement between said discs.

However, the problem in providing a control for the rotation of the driven disc after the driving force for rotating the driving disc has abated is presented which is not solved by the prior art hydraulic clutch mechanisms. In fact, the speed of rotation of the driven disc of the known hydraulic clutch mechanisms is very high even when the driven disc is at the greatest possible distance away from the driving disc and this speed rotation does not become less than thirty to forty percent of the speed of rotation of the driving disc after the driving force for rotating the driving disc has abated.

It is an object of the present invention to provide a hydraulic clutch which will make it possible to control the speed of rotation of the driven mechanism from the maximum speed of rotation of the driving mechanism to zero speed when the speed of rotation of the driving mechanism is not controlled or is independent of the speed requirements of the driven mechanism.

It is a further object of the present invention to provide a hydraulic clutch with which it is possible to control the speed of a fan mechanism which is integrally connected to the driven disc of the hydraulic clutch.

It is a still further object of the present invention to provide the driven disc with axial motion dependent upon temperature.

These and other objects will be apparent from the following description and the drawing showing the apparatus. It is to be understood, however, that the specific embodiment is shown by way of illustration only, to make the principles and practice of the invention more readily comprehensible, and without any intent of limiting the invention to the specific details therein shown.

In the drawings:

FIG. 1a is a longitudinal sectional view of the hydraulic clutch, connected fan, and connected temperature control member illustrating the position of the hydraulic clutch when disengaged.

FIG. 1b is a similar view illustrating the position of the hydraulic clutch when disengaged.

FIG. 2 is a diagram or chart showing the characteristic speed performance curves of driven mechanisms of the prior art and of the present invention after the driving force for rotating the driving mechanism has abated.

Briefly, the invention comprises a control for the driven mechanism of a hydraulic clutch used for the transmission of power. The hydraulic clutch comprises a first and a second rotatable member mounted substantially coaxial with respect to each other. Each of the rotatable members has a plurality of mutually opposed interleaved annular protrusions concentric with respect to the axes of the rotatable members. Driving means are provided for rotating the first rotatable member. Liquid means are disposed between the rotatable members for actuating rotation of the second rotatable member upon rotation of the first rotatable member. Means are also provided for axially moving the second rotatable member with its annular protrusions into and out of engagement with the annular protrusions of the first rotatable member. Clutch means are employed for the control of the driven member of the hydraulic clutch by halting the rotation of the second rotatable member when its annular protrusions are out of engagement with the annular protrusions of the first rotatable member.

Referring more specifically to FIG. 1, a hollow shaft 2 is permitted rotation by conventional ball bearings 11 which are mounted between said shaft 2 and a fixed pillar 1. Provided at one end of the shaft 2 is an integrally connected belt wheel 12 which is driven by a belt 3 from any desired driving mechanism such as the engine of an automobile (not shown).

A radial disc 13 is integrally fixed to the other end of the shaft 2. Disc 13 carries on one side a plurality of axially protruding tapered annuli 4. Located within the hollow shaft 2 is an inner shaft 7 which is set in bearings 14 which are disposed between the inner shaft 7 and the hollow shaft 2 at each end of said hollow shaft 2. Inner shaft 7 is permitted rotational and axial motion by said bearings 14.

Housing 15 is integrally connected to one end of inner shaft 7 and the housing 15 forms the hub of a fan 6. The housing 15 has an inner wall 5 which in turn has a plurality of tapered annuli 16 facing the complementary shaped annuli 4 of the disc 13. The annuli 16 of the wall 5 are half displaced with respect to said tapered annuli 4 so as to permit the annuli 16 to enter the spaces between the annuli 4.

A highly viscous oil e.g. a silicone oil with a viscosity of 200 to 1000 centistokes is disposed within the housing 15. A seal 22 for sealing the oil in the housing 15 is provided between the fixed pillar 1 and the inner wall 5.

The housing 15 with its inner wall 5 is rotated with the disc 13 due to drag effect from the cohesive or adhesive nature of the oil located between said disc 13 and said inner wall 5. The amount of drag can be calculated from the formula $$t = v \frac{Wo}{h}$$

where $t$ represents the drag, $v$ the dynamic viscosity of the oil, $Wo$ the relative speed between the opposing surfaces and $h$ the distance between the opposing surfaces.

From the drag, it is possible to calculate the amount of power transmitted through the clutch given by the formula $$P = t \cdot F$$

where $F$ represents the whole extent of surface on which the drag effect operates.

The fixed machine pillar 1 is integrally connected to a first annular member 17. Provided at one end of said first annular member 17 is a tapered portion 8 corresponding to a tapered surface on a second annular member 18 integrally attached to the inner wall 5.

A spring 25 located between the disc 13 and the housing inner wall 5 is provided as spring means for moving or trying to maintain the tapered surface of said second annular member 18 into frictional contact with the tapered portion 8 of the first annular member 17. The housing 15 with its connected fan 6 is thus brought to a halt in rotation by these means. Spring 25 presses at one end against disc 9 which is mounted on ball bearings 10 and at the other end against the base of a cup-shaped bearing 23. The cup-shaped bearing 23 has at its edge a flange 24 which engages the second annular member 18 of the wall 5.

Referring to FIGS. 1 and 2, it can be seen from the described apparatus of FIG. 1 that a characteristic curve is obtained for the clutch which is similar to the characteristic curve of the fan when the housing 15 is moved axially causing both surface changes and changes in the distance between the opposing tapered surfaces. The speed of the driven mechanism of known devices does not sink below 30 to 40 percent of the speed of the driving mechanism due to the drag effect other than that caused between the tapered surfaces as for example the drag effect occurring between the housing 15 and the rear of disc 13.

In FIG. 2, $n$ represents the speed of rotation of the driven mechanism and $x$ the distance between the tapered surfaces. The rotational driving velocity of the driving mechanism is indicated by $a$ and for known devices the fan's speed of rotation decreases as $x$ increases corresponding to the curve $b$ which when $n=0.3$ to $0.4$ becomes a straight line parallel to the straight line $a$.

However, the arrangement of the clutch means of the subject invention permits the characteristic curve of the fan's speed of rotation to follow curve $c$, whereby the number of revolutions of the driven mechanism reaches zero when the housing 15 is moved to its maximum extent so that the first annular member 17 engages the second annular member 18.

Preferably, the tapered surfaces of annuli 4 and 16 are made to permit frictional engagement between said tapered surfaces at the end of the clutch engaging movement so as to effect a fixed clutch connection which avoids slippage between the disc 13 and the housing 15. The tapered annuli surfaces 4 and 16 have a gradient steeper than 1 in 4 or the angle between the tapering surface and the rotating shaft is greater than 15°.

The base of the tapered annuli 4 and 16 is provided with apertures 19 and 20 respectively so as to permit the escape of the high viscosity liquid. The disc 13 has axial apertures 21 to enable the liquid to go from one side of the disc 13 to the other side when the clutch is let in or out.

An ordinary transmission rod can be provided for operating the clutch by having the rod press the front end of the inner shaft 7. The rod can be operated by hand or provided with automatic control which operates in conjunction with the temperature changes in a radiator or a heat exchanger should the driven mechanism of the hydraulic clutch be provided with a fan.

The shaft 7 can also be operated as shown in FIG. 1 by a temperature actuated member such as by the bellows of a thermostat. The front end of the bellows 26 rests against the front end of the shaft 7 and the pressure fluid is conducted to the bellows by means of pipe 27. Thus the thermostat is provided to directly operate a pressure transmission member and therefore, cause the axial movement of the driven parts of the driven mechanism to a position to either cause rotation or halt rotation of the driven member of the hydraulic clutch.

The operation of the hydraulic clutch with its control clutch for the driven mechanism is as follows:

When the bellows 26 due to the amount of fluid pressure located therein or any other actuating member moves the inner wall 5 of housing 15 connected to inner shaft 7 towards the rotating driving disc 13 then rotation of the fan 6 is caused by the rotation of housing 15 with inner wall 5. This is achieved due to the drag effect of the high viscosity oil located between the disc 13 and inner wall 5. Disc 13 is rotated by means of the belt 3 which rotates belt wheel 12 and the hollow shaft 2 which integrally connects the belt wheel 12 to the disc 13.

When the bellows 26 or any other actuating member moves the inner wall 5 away from the rotating driving disc 13 then spring 25 urges the tapered surface of annular member 18 into frictional contact with the tapered portion 8 of annular member 17. Liquid means may be disposed in the space between the annular members 17 and 18 so as to achieve a braking effect prior to the frictional contact of the tapered surfaces of said members 17 and 18 due to the drag effect of the oil.

The torque of the driven mechanism is greatly dependent on the speed of rotation and control of the rotation of the driven mechanism will control fans for cooling systems, especially for radiators or heat exchangers in automobiles. With such fans, the torque falls off according to the square of the number of revolutions. Thus the required torque decreases after the third power so that when the fan rotates at half-speed then only a driving power of 12.5% is necessary.

This completes the description of the embodiment of the device of the present invention. It will be readily apparent that many modifications and variations thereof may be made by anyone skilled in the art, in accordance with the principles of the invention hereinabove set forth and without the use of any inventive ingenuity. Therefore, without limitation in this respect, the invention is defined by the following claims.

We claim:

1. A hydraulic clutch device for the transmission of power comprising, in combination: a first rotatable member and a second rotatable member, each rotatable member mounted substantially coaxially with respect to the other and said second member having walls forming a cavity about said first member, said rotatable members having a plurality of mutually opposed interleaved annular protrusions concentric with respect to the axes of said rotatable members, the annular protrusions of said first rotatable member and said second rotatable member being provided with complementary tapered surfaces for frictional engagement of the first rotatable member with the second rotatable member along substantially the entire surfaces of said protrusions, the tapered annular surfaces having a gradient steeper than 1:4; driving means for rotating said first rotatable member; a liquid of high viscosity disposed within said cavity of said second rotatable member and between said rotatable members for actuating rotation of said second rotatable member upon rotation of said first rotatable member; means for axially moving said second rotatable member with its annular protrusions into engagement with the annular protrusions of said first rotatable member; brake means for halting the rotation of said second rotatable member when its annular protrusions are out of engagement with the annular protrusions of said first rotatable member, said brake means comprising a stationary first annular brake member mounted concentrically with respect to the axes of said rotatable members and a second annular brake member integrally connected to said second rotatable member; and spring means for moving said second annular brake member into frictional contact with the said first stationary annular member and for moving said second rotatable member with its annular protrusions out of engagement with the annular protrusions of said first rotatable member.

2. A hydraulic clutch device for the transmission of power as defined in claim 1 wherein a first annular brake member and said second annular brake member are provided with connecting tapered portions.

3. A hydraulic clutch device for the transmission of power comprising:
- a rigid stationary annular support;
- an annular driving member journalled within said rigid stationary annular support;
- an axially slidable driven shaft journalled within said annular driving member;
- an annular oil tight housing integrally formed at one end of said driven shaft, one wall of said oil tight housing comprising a plurality of annular protrusions concentric to the axes of rotation of said driven shaft and driving member;
- an annular plate integrally formed at one end of said driving member and extending within said oil tight housing, one wall of said annular plate comprising a plurality of annular protrusions concentric with respect to the axes of rotation of said driven shaft and driving member, and facing the annular protrusions of said oil tight housing in mutually opposed interleaving relationship to effect clutch engaging means, said opposed annular protrusions being provided with complementary tapered surfaces for frictional engagement of said driven shaft and driving member;
- driving means for rotating said driving member;
- a high viscosity liquid within said oil tight housing for effecting a fluid coupling between said driven shaft and driving member;
- brake means for preventing rotation of said driven shaft when its annular protrusions are out of engagement with the annular protrusions of said driving member, said brake means comprising a first annular brake member rigidly attached to said stationary rigid support concentric to the axis of rotation of said driven shaft and driving member and a second annular brake member rigidly mounted on said oil tight housing and in facing relationship with said first annular brake member;
- spring means for constantly urging said second annular brake member into frictional contact with said first stationary annular brake member and for moving said slidable driven shaft with its oil tight housing and annular protrusions out of engagement with the complementary annular protrusions of said driving member;
- and actuating means for axially forcing said driven shaft against the force of said spring means to release said brake means and to cause engagement of said oil tight housing annular protrusions with the complementary protrusions of said driving member to effect clutching.

4. A hydraulic clutch device for the transmission of power as defined in claim 1 wherein there is provided a rotating fan integrally connected to said second rotatable member.

5. A hydraulic clutch for the transmission of power as defined in claim 1 wherein said means for axially moving said second rotatable member with respect to said first rotatable member comprise a rod integrally connected to said second rotatable member, and a temperature actuating means to effect axial movement of said rod.

6. A hydraulic clutch for the transmission of power as defined in claim 5 wherein said temperature actuating means comprises a bellows and a pipe connected to said bellows for the transmission of pressure fluid therein.

References Cited in the file of this patent
UNITED STATES PATENTS

| | | |
|---|---|---|
| 1,238,447 | Severy | Aug. 28, 1917 |
| 1,249,660 | Olson | Dec. 11, 1917 |
| 1,460,217 | Smith et al. | June 26, 1923 |
| 2,524,389 | Lalonde | Oct. 3, 1950 |
| 2,840,316 | Herbenar | June 24, 1958 |
| 2,879,755 | Weir | Mar. 31, 1959 |

FOREIGN PATENTS

| | | |
|---|---|---|
| 745,765 | Great Britain | Feb. 29, 1956 |
| 1,196,282 | France | May 25, 1959 |